United States Patent
Wang

(10) Patent No.: US 9,805,426 B2
(45) Date of Patent: Oct. 31, 2017

(54) METHOD FOR HIDING ACTIVITY GROUP MEMBER IDENTIFICATION INFORMATION, SERVER AND TERMINAL

(71) Applicant: Tencent Technology (Shenzhen) Company Limited, Shenzhen (CN)

(72) Inventor: Dong Wang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 538 days.

(21) Appl. No.: 14/260,026

(22) Filed: Apr. 23, 2014

(65) Prior Publication Data
US 2014/0237050 A1    Aug. 21, 2014

Related U.S. Application Data

(63) Continuation of application No. PCT/CN2013/089067, filed on Dec. 11, 2013.

(30) Foreign Application Priority Data

Dec. 12, 2012  (CN) .......................... 2012 1 0535221

(51) Int. Cl.
*G06F 15/16* (2006.01)
*G06Q 50/00* (2012.01)
(Continued)

(52) U.S. Cl.
CPC ......... *G06Q 50/01* (2013.01); *H04L 12/1822* (2013.01); *H04L 63/0407* (2013.01); *H04L 63/104* (2013.01)

(58) Field of Classification Search
CPC .................................................. H04L 63/104
(Continued)

(56) References Cited

U.S. PATENT DOCUMENTS

2002/0184217 A1* 12/2002 Bisbee ................... G06F 21/33
2003/0083086 A1*  5/2003 Toyryla .................. H04W 4/08
                                                       455/518
(Continued)

FOREIGN PATENT DOCUMENTS

CN        1514611 A      7/2004
CN        1761926 A      4/2006
(Continued)

OTHER PUBLICATIONS

Tencent Technology, ISRWO, PCT/CN2013/089067, Mar. 20, 2014, 6 pgs.
(Continued)

*Primary Examiner* — Karen Tang
(74) *Attorney, Agent, or Firm* — Morgan, Lewis & Bockius LLP

(57) ABSTRACT

A method at a server system includes: grouping multiple users into an activity group, where each user has a unique identifier across different activity groups; generating, for each user of the activity group, a dynamic identifier within the activity group and a mapping between the dynamic identifier and the user's corresponding unique identifier, where the dynamic identifier may identify different users within different activity groups; receiving an operation instruction from a first user of the activity group, the operation instruction including a first unique identifier associated with the first user; identifying a first dynamic identifier associated with the first user within the activity group based on the first unique identifier associated with the first user; associating with the operation instruction the first dynamic identifier associated with the first user within the activity group; and sending the operation instruction and the first dynamic identifier to the users of the activity group.

17 Claims, 10 Drawing Sheets

(51) Int. Cl.
*H04L 29/06* (2006.01)
*H04L 12/18* (2006.01)
(58) Field of Classification Search
USPC .......................................................... 709/204
See application file for complete search history.

(56) References Cited

U.S. PATENT DOCUMENTS

| | | | | |
|---|---|---|---|---|
| 2003/0145204 | A1* | 7/2003 | Nadooshan | H04L 9/3234 713/172 |
| 2009/0092256 | A1* | 4/2009 | Nakazawa | H04L 9/3247 380/285 |
| 2009/0158301 | A1* | 6/2009 | Holan | G06F 11/3051 719/321 |
| 2010/0177661 | A1* | 7/2010 | Dailey | H04W 4/08 370/254 |
| 2010/0205193 | A1* | 8/2010 | Krishna | G06F 17/30528 707/758 |
| 2010/0311459 | A1* | 12/2010 | Holland | H04W 8/186 455/518 |
| 2011/0182426 | A1* | 7/2011 | Roosta | H04L 9/0833 380/255 |
| 2011/0196977 | A1* | 8/2011 | Lynch | H04W 8/186 709/229 |
| 2011/0302014 | A1* | 12/2011 | Proctor, Jr. | G06Q 30/0623 705/14.23 |
| 2012/0058826 | A1* | 3/2012 | Amaitis | G07F 17/3218 463/42 |
| 2012/0063335 | A1* | 3/2012 | Cho | H04W 8/186 370/252 |
| 2012/0266250 | A1* | 10/2012 | Uhl | G06F 21/6254 726/26 |
| 2013/0325655 | A1* | 12/2013 | Wouhaybi | G06Q 30/0631 705/26.7 |
| 2014/0115169 | A1* | 4/2014 | Gao | H04L 63/104 709/226 |
| 2015/0189631 | A1* | 7/2015 | He | H04W 4/08 455/418 |
| 2015/0215186 | A1* | 7/2015 | Alonso Franco | H04L 63/102 709/224 |

FOREIGN PATENT DOCUMENTS

| | | |
|---|---|---|
| CN | 101193346 A | 6/2008 |
| CN | 101771696 A | 7/2010 |
| CN | 101808094 A | 8/2010 |
| CN | 102394762 A | 3/2012 |
| CN | 102647430 A | 8/2012 |

OTHER PUBLICATIONS

Tencent Technology, IPRP, PCT/CN2013/089067, Jun. 6, 2015, 4 pgs.

* cited by examiner

METHOD FOR HIDING ACTIVITY GROUP MEMBER IDENTIFICATION INFORMATION, SERVER AND TERMINAL

RELATED APPLICATIONS

This application is a continuation application of PCT Patent Application No. PCT/CN2013/089067, entitled "METHOD FOR HIDING ACTIVITY GROUP MEMBER IDENTIFICATION INFORMATION, SERVER AND TERMINAL" filed Dec. 11, 2013, which claims priority to Chinese Patent Application No. 201210535221.X, titled "Method for Hiding Activity Group Member Identification Information, Server and Terminal," filed Dec. 12, 2012, both of which are hereby incorporated by reference in their entirety.

FIELD OF THE INVENTION

The present application relates to the field of communication technologies, and more particularly, to a method for hiding activity group member identification information, a server and a terminal.

BACKGROUND

A user usually may use an account (sometimes also referred to as username) when obtaining a service provided by a server in the network, the account is unique in the server, and thus the account is often used as identification information of the user. As the account is user identity information, it can identify user identity at the user side. It should be noted that, the identity information, in addition to the account, may have other presentation forms to serve as information that users at the terminal side can identify, and thus the specific presentation form of the identity information is not limited in the present application document.

After the user uses the account to log on to the server, in the process of obtaining various services in the network, the user forms an activity group with other users, and performs information exchange in the activity group through the server; the user may not want other users in the activity group to know his/her own account information, and the operator of the server may not want the user to have access to other users' account information either.

For example, in the network game, in order to prevent acts such as intentional cheating or swindle among familiar players from damaging fairness of the game, the following scheme is usually adopted: make unified registration for players, then randomly bring the players together, and reduce the possibility that familiar players are brought together in the same activity group. However, possibility still exists that partner players and other normal players are brought together for the game, and the cheaters may, by performing operations such as open hand and doubling in the initial stage of the game, increase the multiple, and then cheat, to achieve greater interests, damaging the game balance. For another example, in the game of go, partner players brought together intentionally lose each other, to achieve the purpose of increasing points, which damages the game balance. Thus, it is necessary to hide account information for players, so as to prevent the players from performing subsequent cheating acts by identifying partner players.

For another example, during the remote working group conference, voting is required, but a conference participant' account could be seen by other conference participants, and a secret ballot cannot be performed. Thus, it is also necessary to hide the conference participant' account.

In order to realize hiding of player information, the current general realization scheme is realized in a terminal: an identification server sends a hide information activity group instruction to the terminal. The terminal does not explicitly display at all places concerning a user account in the activity group for which information is hidden, so as to achieve the effect of hiding information.

However, in the above scheme, all acts of hiding information are implemented at the terminal. By cracking the client in the terminal, user identity information can be acquired. The user account usually is a unique key value for normally acquiring a service, and the activity group instruction cannot be sent if the account is hidden at a position where the server sends player information. Thus, the above scheme cannot implement secure hiding of activity group member identification information.

SUMMARY

In accordance with some embodiments, a method at a server system includes: grouping a plurality of users into an activity group, wherein each user has a unique identifier across different activity groups; generating, for each user of the plurality of users of the activity group, a dynamic identifier within the activity group and a mapping between the dynamic identifier and the user's corresponding unique identifier, wherein the dynamic identifier may identify different users within different activity groups; receiving an operation instruction from a first user of the plurality of users of the activity group, the operation instruction including a first unique identifier associated with the first user; identifying a first dynamic identifier associated with the first user within the activity group based on the first unique identifier associated with the first user; associating with the operation instruction the first dynamic identifier associated with the first user within the activity group; and sending the operation instruction and the first dynamic identifier to the plurality of users of the activity group.

In accordance with some embodiments, a server includes memory, one or more processors, and one or more programs, wherein the one or more programs are stored in the memory and configured to be executed by the one or more processors. The one or more programs include instructions for: grouping a plurality of users into an activity group, wherein each user has a unique identifier across different activity groups; generating, for each user of the plurality of users of the activity group, a dynamic identifier within the activity group and a mapping between the dynamic identifier and the user's corresponding unique identifier, wherein the dynamic identifier may identify different users within different activity groups; receiving an operation instruction from a first user of the plurality of users of the activity group, the operation instruction including a first unique identifier associated with the first user; identifying a first dynamic identifier associated with the first user within the activity group based on the first unique identifier associated with the first user; associating with the operation instruction the first dynamic identifier associated with the first user within the activity group; and sending the operation instruction and the first dynamic identifier to the plurality of users of the activity group.

In some embodiments, a non-transitory computer readable storage medium stores one or more programs. The one or more programs include instructions, which when executed by a server, cause the server to: group a plurality of users into an activity group, wherein each user has a unique identifier across different activity groups; generate, for each user of the plurality of users of the activity group, a dynamic identifier within the activity group and a mapping between the dynamic identifier and the user's corresponding unique identifier, wherein the dynamic identifier may identify different users within different activity groups; receive an operation instruction from a first user of the plurality of users of the activity group, the operation instruction including a first unique identifier associated with the first user; identify a first dynamic identifier associated with the first user within the activity group based on the first unique identifier associated with the first user; associate with the operation instruction the first dynamic identifier associated with the first user within the activity group; and send the operation instruction and the first dynamic identifier to the plurality of users of the activity group.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

To illustrate the technical solutions according to the embodiments of the present application more clearly, the accompanying drawings for describing the embodiments are introduced briefly in the following. Apparently, the accompanying drawings in the following description are only some embodiments of the present application, and persons of ordinary skill in the art can derive other drawings from the accompanying drawings without creative efforts.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solution and merits of the present application clearer, a detailed description of the present application is hereinafter given with reference to accompanying drawings. Apparently, the embodiments described below are for the exemplary purpose only, without covering all embodiments of the present application. All other embodiments obtained by persons of ordinary skill in the art based on the embodiments of the present application without creative efforts shall fall within the protection scope of the present application.

Figure 1:
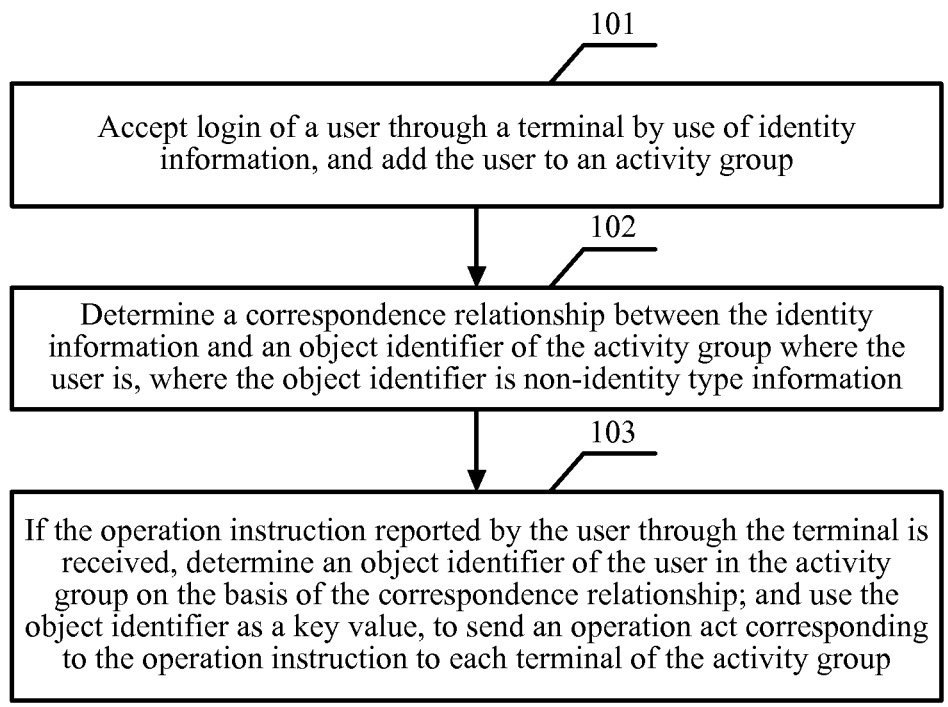
FIG. 1 is a schematic flow chart of a method according to an embodiment of the present application.

Embodiments of the present application provide a method for hiding activity group member identification information, as shown in FIG. 1, the method including the following steps.

101: accept login of a user through a terminal by use of identity information, and add the user to an activity group.

Optionally, the identity information is an account. It should be noted that, the identity information is information used for indicating user identity, i.e., information that the user can determine who a user is according to the user identity information at a terminal side, so in addition to the account, the identity information may have other presentation forms, and therefore the specific presentation form of the identity information is not limited in the present application document. It can be confirmed that the scheme in this embodiment is a scheme at a server side through the step.

102: determine a correspondence relationship between the identity information and an object identifier of the activity group where the user is, where the object identifier is non-identity type information.

In this step, there are numerous alternatives for the presentation form of the object identifier, as long as it is not the identity type information, and the object identifier includes identity information and information that can restore identity information at the terminal side. Several examples are given below.

Optionally, the determine a correspondence relationship between the identity information and an object identifier of the activity group where the user is includes: recording a position of the user in the activity group, and determining a correspondence relationship between the identity information and the position of the user in the activity group; using an object identifier as a key value in the following step 103 includes: using the position of the user in the activity group as a key value. The object identifier in the example of this embodiment is: the position of the user in the activity group. The position of the user in the activity group will be described by taking a seat number in a game room number as an example in the following embodiments.

Corresponding to the specific presentation form of the object identifier, an operation instruction reported by the user through the terminal includes: an operation instruction reported by the user by taking user identity information as a key value through the terminal; or, an operation instruction reported by the user by taking an activity group identification number and the position of the user in the activity group as a key value through the terminal.

Optionally, the determine a correspondence relationship between the identity information and an object identifier of the activity group where the user is includes: generating and storing a dynamic identifier corresponding to identity information, sending the dynamic identifier to a terminal of the user corresponding to the identity information, and determining a correspondence relationship between the identity information and the dynamic identifier; and using an object identifier as a key value in the following step 103 includes: using the dynamic identifier as a key value. The object identifier in the example of this embodiment is: dynamic identifier. Generation of the dynamic identifier may be obtained through calculation according to a random algorithm or other rules, and the specific obtaining manner is not limited in the embodiment of the present application.

Corresponding to the specific presentation form of the object identifier, an operation instruction reported by the user through the terminal includes: an operation instruction reported by the user by taking user identity information as a key value through the terminal; or, an operation instruction reported by the user by taking the dynamic identifier of the user as a key value through the terminal.

In the above embodiment, reporting of the operation instruction at the terminal side can use the user identity information as a key value to report the operation instruction, and in this way, the process of reporting the operation instruction may not be modified. Reporting of the operation instruction may also be executed with the presentation form corresponding to the object identifier.

103: if the operation instruction reported by the user through the terminal is received, determine an object identifier of the user in the activity group on the basis of the correspondence relationship; and use the object identifier as a key value, to send an operation act corresponding to the operation instruction to each terminal of the activity group.

Control of the scheme is executed at the server side, an object identifier of the non-identity type information is sent to the terminal, and thus identity information of other users cannot be obtained by cracking clients, thereby implementing secure hiding of activity group member identification information.

Figure 2:
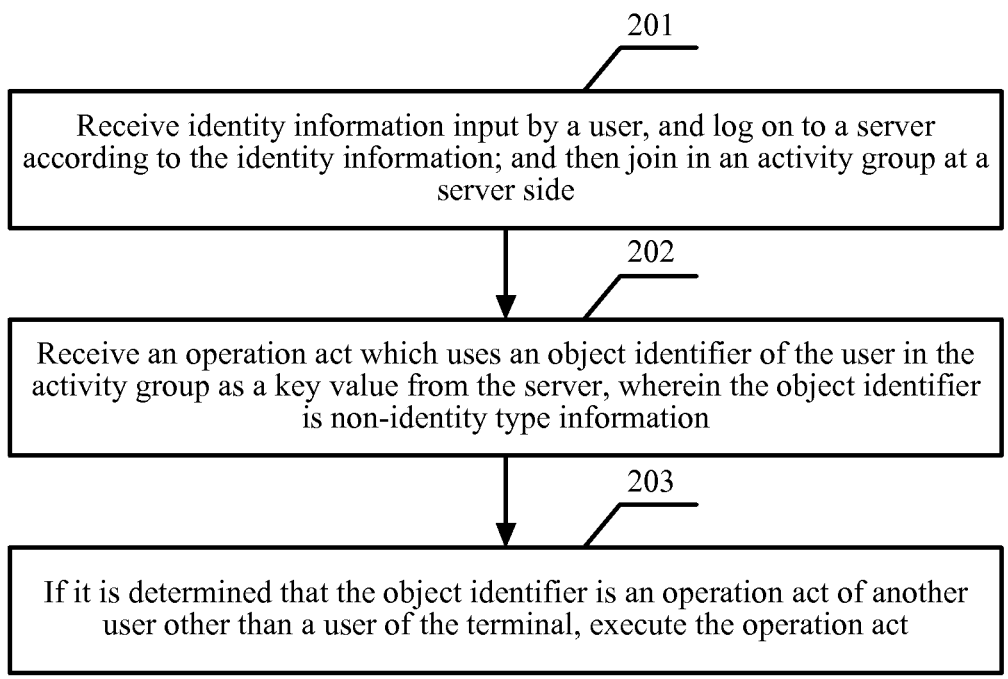
FIG. 2 is a schematic flow chart of a method according to an embodiment of the present application.

The embodiments of the present application further provide another method for hiding activity group member identification information, and the method in this embodiment is implemented at a terminal side, which may be a terminal running a client, as shown in FIG. 2, the method including the following steps.

201: receive identity information input by a user, and log on to a server according to the identity information; and then join in an activity group at a server side.

Optionally, the identity information is an account. It should be noted that, the identity information is information used for indicating user identity, i.e., information that the user can determine who a user is according to the user identity information at a terminal side, so in addition to the account, the identity information may have other presentation forms, and therefore the specific presentation form of the identity information is not limited in the present application document. It can be confirmed that the scheme in this embodiment is a scheme at a server side through the step.

202: receive an operation act which uses an object identifier of the user in the activity group as a key value from the server, wherein the object identifier is non-identity type information.

In this step, there are numerous alternatives for the presentation form of the object identifier, as long as it is not the identity type information, and the object identifier includes identity information and information that can restore identity information at the terminal side. Several examples are given below.

The object identifier of the user in the activity group includes: user identity information, activity group identification number and a position of the user in the activity group, and a dynamic identifier received from the server.

Generation of the dynamic identifier may be obtained through calculation according to a random algorithm or other rules, and the specific obtaining manner is not limited in the embodiment of the present application. The position of the user in the activity group will be described by taking a seat number in a game room number as an example in the following embodiments.

203: if it is determined that the object identifier is an operation act of another user other than a user of the terminal, execute the operation act.

Control of the scheme is executed at the server side, an object identifier of the non-identity type information is sent to the terminal, and thus identity information of other users cannot be obtained by cracking clients, thereby implementing secure hiding of activity group member identification information.

Users in the above scheme only serve as participants of the activity group, and if the users also serve as persons sending an operation, the method further includes: receiving and executing an operation instruction input by a user, and using an object identifier of the user in the activity group as a key value to report the operation instruction.

To describe the schemes of the embodiments more clearly, this embodiment will describe the position of the user in the activity group by taking a seat number in a game room number as an example. This scheme achieves anti-cheating effects through a game room model of hiding player information.

Three players (i.e., three users) play a game at the same table (i.e., belong to the same activity group), identity information respectively is three players, A, B, and C, and seat numbers of seats corresponding to the three players are 1, 2, and 3 respectively. After the players sit down at the same table, the same server logically controls game background acts. Please refer to FIG. 3 for the specific process, including the following steps.

301: when Player A generates a game act through a client, the client may receive an operation instruction input by the Player A, and then the client uses user information of the Player A as a key value, to report the operation instruction to a server.

302: the server finds a corresponding table according to the user information of the Player A, converts the game act of the Player A into an operation act with a seat number of 1, and forwards the operation act to players at the corresponding table.

303: the Player A, upon receiving a message, judges that the operation act is his/her own act and has been executed, and ignores the operation act. Player B and Player C receive the operation act of the player whose seat number is 1 sent by the server, and perform logical execution. Execution processes of operation instructions of the Player B and the Player C are identical with the above process, and are not repeated one by one.

In the scheme, the Player B and the Player C each only receive a seat number 1, and the operation act of the seat number 1, and thus the Player B and the Player C may not acquire identity information of the Player A, and therefore cannot identify who the Player A is, thereby implementing hiding of identity information of the players at the same table. Control of the scheme is executed at the server side, and thus identity information of other users cannot be obtained by cracking clients, thereby implementing secure hiding of activity group member identification information.

Figure 4:
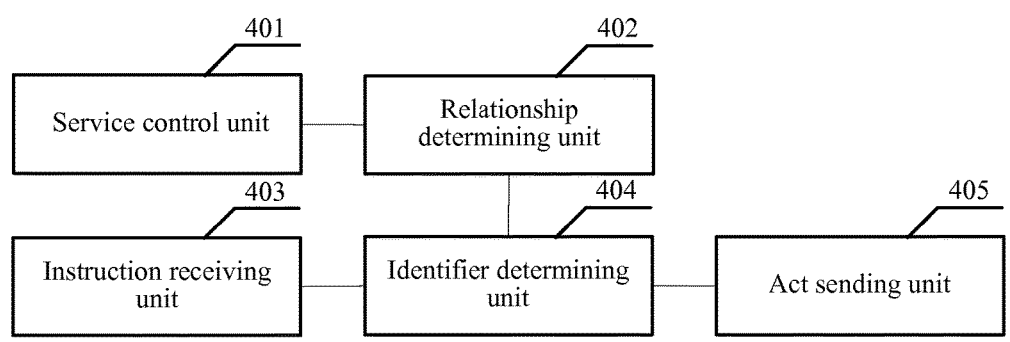
FIG. 4 is a schematic structural view of a server according to an embodiment of the present application.

The embodiments of the present application further provide a server, as shown in FIG. 4, including:

a service control unit 401, used for accepting login of a user through a terminal by use of identity information, and adding the user to an activity group;

a relationship determining unit 402, used for determining a correspondence relationship between the identity information accepted by the service control unit 401 and an object identifier of the activity group where the user is, where the object identifier is non-identity type information;

an instruction receiving unit 403, used for receiving an operation instruction reported by the user through a terminal;

an identifier determining unit 404, used for, if the instruction receiving unit 403 receives the operation instruction reported by the user through a terminal, determining an object identifier of the user in the activity group according to the correspondence relationship determined by the relationship determining unit 402; and an act sending unit 405, used for using the object identifier determined by the identifier determining unit 404 as a key value, and sending an operation act corresponding to the operation instruction to each terminal in the activity group.

Control of the scheme is executed at the server side, an object identifier of the non-identity type information is sent to the terminal, and thus identity information of other users cannot be obtained by cracking clients, thereby implementing secure hiding of activity group member identification information.

There are numerous alternatives for the presentation form of the object identifier, as long as it is not the identity type information, and the object identifier includes identity information and information that can restore identity information at the terminal side. Several examples are given below.

Optionally, the relationship determining unit 402 is specifically used for recording a position of the user in the activity group, and determining a correspondence relationship between the identity information and the position of the user in the activity group; and the act sending unit 405 is specifically used for taking the position of the user in the activity group determined by the identifier determining unit 404 as a key value.

Optionally, the instruction receiving unit 403 is specifically used for receiving an operation instruction reported by the user by taking user identity information as a key value through the terminal; or, used for receiving an operation instruction reported by the user by taking an activity group identification number and the position of the user in the activity group as a key value through the terminal.

Optionally, the relationship determining unit 402 is specifically used for generating and storing a dynamic identifier corresponding to identity information, sending the dynamic identifier to a terminal of the user corresponding to the identity information, and determining a correspondence relationship between the identity information and the dynamic identifier; and the act sending unit 405 is specifically used for taking the dynamic identifier as a key value.

Optionally, the instruction receiving unit 403 is specifically used for receiving an operation instruction reported by the user by taking user identity information as a key value through the terminal; or, specifically used for receiving an operation instruction reported by the user by taking the dynamic identifier of the user as a key value through the terminal.

Figure 5:
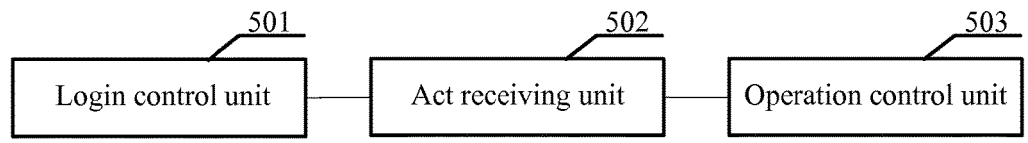
FIG. 5 is a schematic structural view of a terminal according to an embodiment of the present application.

The embodiments of the present application further provide a terminal, as shown in FIG. 5, including:

a login control unit 501, used for receiving identity information input by a user, and logging on to a server according to the identity information; and then joining in an activity group at a server side;

an act receiving unit 502, used for receiving an operation act which uses an object identifier of the user in the activity group as a key value from the server, where the object identifier is non-identity type information; and an operation control unit 503, used for, if it is determined that the object identifier received by the act receiving unit 502 is an operation act of another user other than a user of the terminal, executing the operation act.

Control of the scheme is executed at the server side, an object identifier of the non-identity type information is sent to the terminal, and thus identity information of other users cannot be obtained by cracking clients, thereby implementing secure hiding of activity group member identification information.

Figure 6:
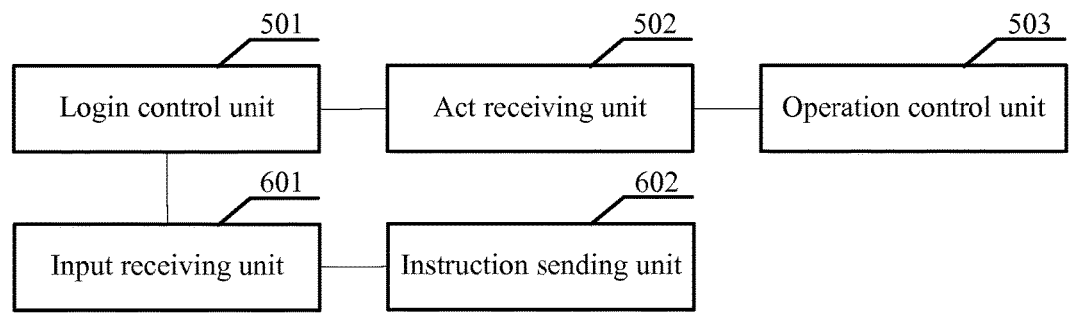
FIG. 6 is a schematic structural view of a terminal according to an embodiment of the present application.

Further, users in the above scheme only serve as participants of the activity group, and if the users also serve as persons sending an operation, as shown in FIG. 6, the terminal further includes: an input receiving unit 601, used for receiving and executing an operation instruction input by a user; and an instruction sending unit 602, used for taking an object identifier of the user in the activity group as a key value to report the operation instruction.

Optionally, the instruction sending unit 602 is specifically used for taking any one of the user identity information, the activity group identification number and the position of the user in the activity group, and the dynamic identifier received from the server as a key value to report the operation instruction.

Figure 7:
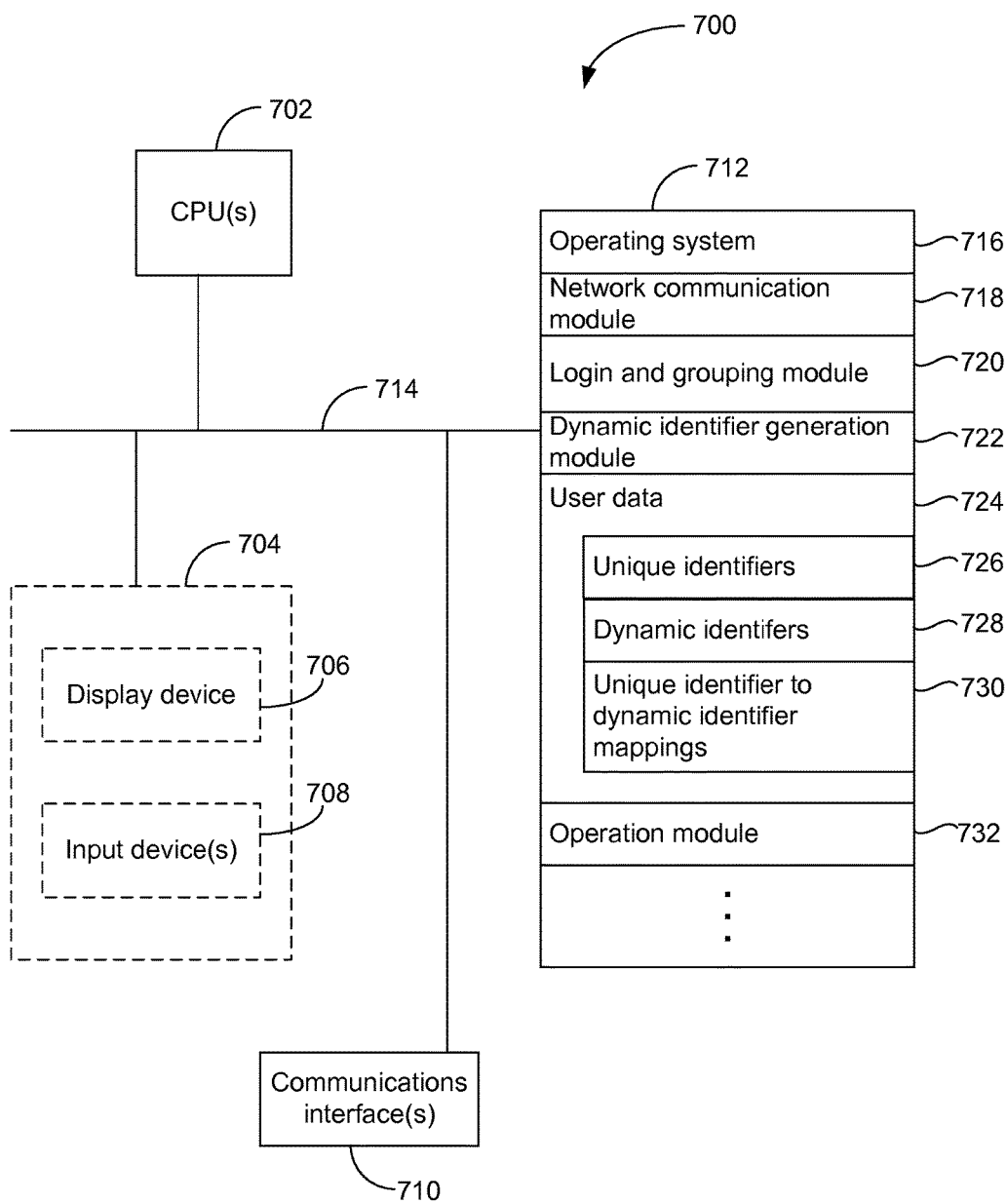
FIG. 7 is a block diagram illustrating a server in accordance with some embodiments.

FIG. 7 is a block diagram illustrating a server 700 in accordance with some embodiments. The client device 700 typically includes one or more processing units (CPU's) 702 for executing modules, programs and/or instructions stored in memory 712 and thereby performing processing operations; one or more network or other communications interfaces 710; memory 712; and one or more communication buses 714 for interconnecting these components. The communication buses 714 optionally include circuitry (sometimes called a chipset) that interconnects and controls communications between system components. The client device 700 optionally includes a user interface 704 comprising a display device 706 and one or more input device(s) (e.g., keyboard, mouse, touch-sensitive surface) 708. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. Memory 712, or alternately the non-volatile memory device(s) within memory 712, comprises a non-transitory computer readable storage medium. In some embodiments, memory 712, or the computer readable storage medium of memory 712 stores the following programs, modules and data structures, or a subset thereof:

an operating system 716 that includes procedures for handling various basic system services and for performing hardware dependent tasks;

a network communication module 718 that is used for connecting the client device 700 to other computers via the one or more communication network interfaces 710 (wired or wireless) and one or more communication networks, such as the Internet, other wide area networks, local area networks, metropolitan area networks, and so on;

a login and grouping module 720 for receiving logins from users and grouping users into activity groups;

a dynamic identifier generation module 722 for generating dynamic identifiers for users within activity groups;

user data 724, including login credentials (not shown), unique identifiers 726, dynamic identifiers 728, and unique identifier to dynamic identifier mappings 730; and operation module 732 for receiving operation instructions from client devices, identifying the unique identifiers of the users initiating the operation instructions, associating the operation instructions with the dynamic identifiers of the respective users initiating the operation instructions based on the unique identifiers, and sending the operation instructions and dynamic identifiers to client devices.

Unique identifiers 726 uniquely identify respective users across the online applications and services hosted by the server 700; each user has his own unique identifier that is different from every other unique identifier. Dynamic identifiers 728 identify respective users within an activity group, and are not unique across different activity groups; a user within one activity group may have a dynamic identifier in common as another user within another activity group. Unique identifier to dynamic identifier mappings 730 map the unique identifiers of users to the dynamic identifiers that the users have within an activity group.

In some embodiments, the user data 724 maintains records of dynamic identifiers mapped to a unique identifier over time, and thus the user 724 also includes data that indicates the time periods a dynamic identifier is mapped, within a respective activity group, to a respective unique identifier.

Each of the above identified elements may be stored in one or more of the previously mentioned memory devices, and corresponds to a set of instructions for performing a function described above. The above identified modules, units or programs (i.e., sets of instructions) need not be implemented as separate software programs, procedures, units or modules, and thus various subsets of these modules may be combined or otherwise re-arranged in various embodiments. In some embodiments, memory 712 may store a subset of the modules and data structures identified above. Furthermore, memory 712 may store additional modules and data structures not described above.

Although FIG. 7 shows a "server," FIG. 7 is intended more as functional description of the various features which may be present in a set of client devices than as a structural schematic of the embodiments described herein. In practice, and as recognized by those of ordinary skill in the art, items shown separately could be combined and some items could be separated. For example, resources list 720 and resources 722 may be stored in a distributed server system.

Figure 8:
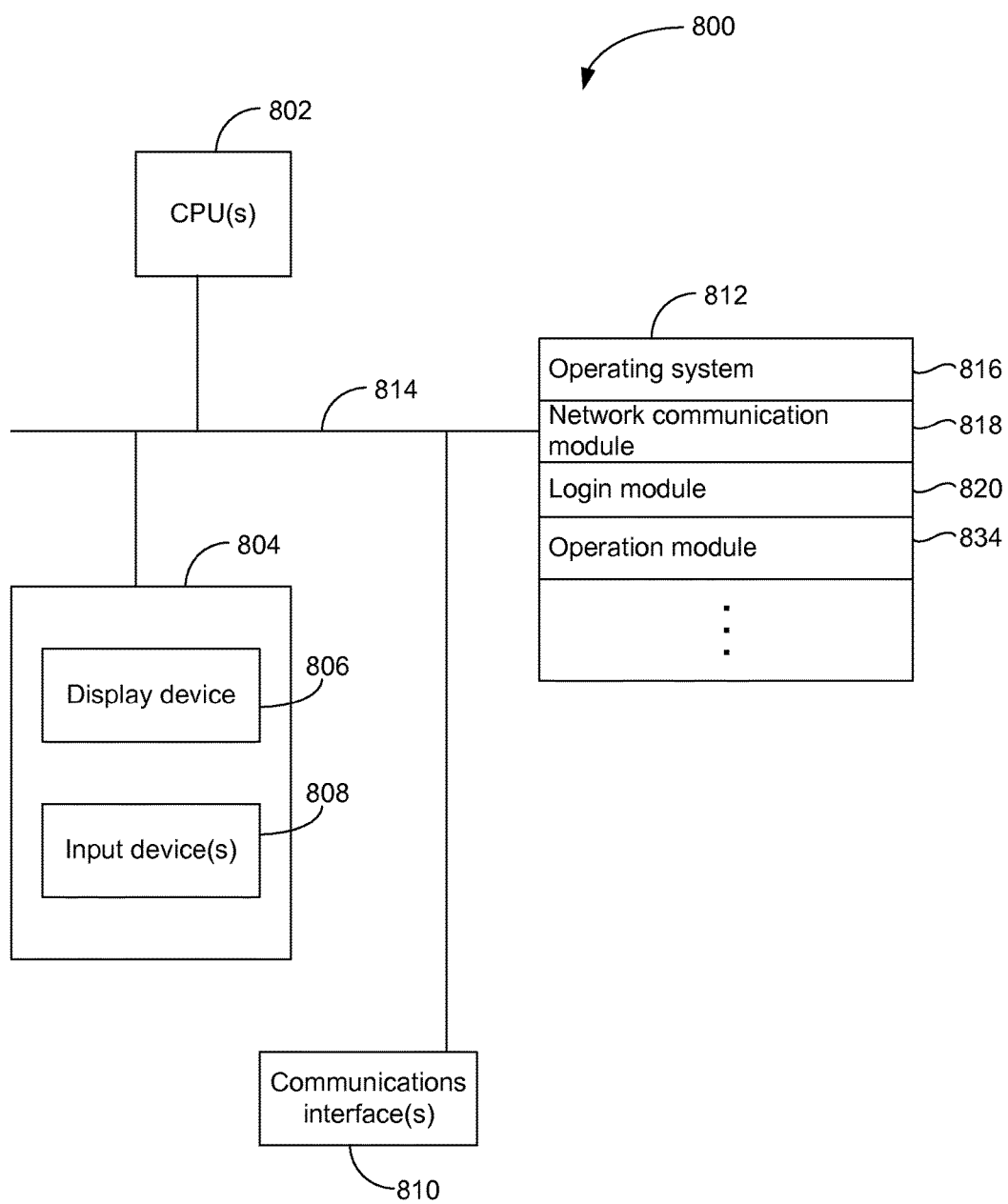
FIG. 8 is a block diagram illustrating a client device in accordance with some embodiments.

FIG. 8 is a block diagram illustrating a client device 800 in accordance with some embodiments. The client device 800 typically includes one or more processing units (CPU's) 802 for executing modules, programs and/or instructions stored in memory 812 and thereby performing processing operations; one or more network or other communications interfaces 810; memory 812; and one or more communication buses 814 for interconnecting these components. The communication buses 814 optionally include circuitry (sometimes called a chipset) that interconnects and controls communications between system components. The client device 800 includes a user interface 804 comprising a display device 806 and one or more input device(s) (e.g., keyboard, mouse, touch-sensitive surface) 808. In some embodiments, an input device 808 is integrated with the display device 806. For example, a touch screen includes a touch-sensitive surface integrated with the display device 806. Memory 812 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 812 may optionally include one or more storage devices remotely located from the CPU(s) 802. Memory 812, or alternately the non-volatile memory device(s) within memory 812, comprises a non-transitory computer readable storage medium. In some embodiments, memory 812, or the computer readable storage medium of memory 812 stores the following programs, modules and data structures, or a subset thereof:

- an operating system 816 that includes procedures for handling various basic system services and for performing hardware dependent tasks;
- a network communication module 818 that is used for connecting the client device 800 to other computers via the one or more communication network interfaces 810 (wired or wireless) and one or more communication networks, such as the Internet, other wide area networks, local area networks, metropolitan area networks, and so on;
- a login module 820 for logging into an online application or service hosted by a server system (e.g., server 700); and
- an operation module 834 for receiving requests to initiate operation instructions from users, sending operation instructions to a server system (e.g., server 700), and receiving operation instructions with dynamic identifiers from the server system.

Each of the above identified elements may be stored in one or more of the previously mentioned memory devices, and corresponds to a set of instructions for performing a function described above. The above identified modules, units or programs (i.e., sets of instructions) need not be implemented as separate software programs, procedures, units or modules, and thus various subsets of these modules may be combined or otherwise re-arranged in various embodiments. In some embodiments, memory 812 may store a subset of the modules and data structures identified above. Furthermore, memory 812 may store additional modules and data structures not described above.

Although FIG. 8 shows a "client device," FIG. 8 is intended more as functional description of the various features which may be present in a set of client devices than as a structural schematic of the embodiments described herein. In practice, and as recognized by those of ordinary skill in the art, items shown separately could be combined and some items could be separated.

Figure 9:
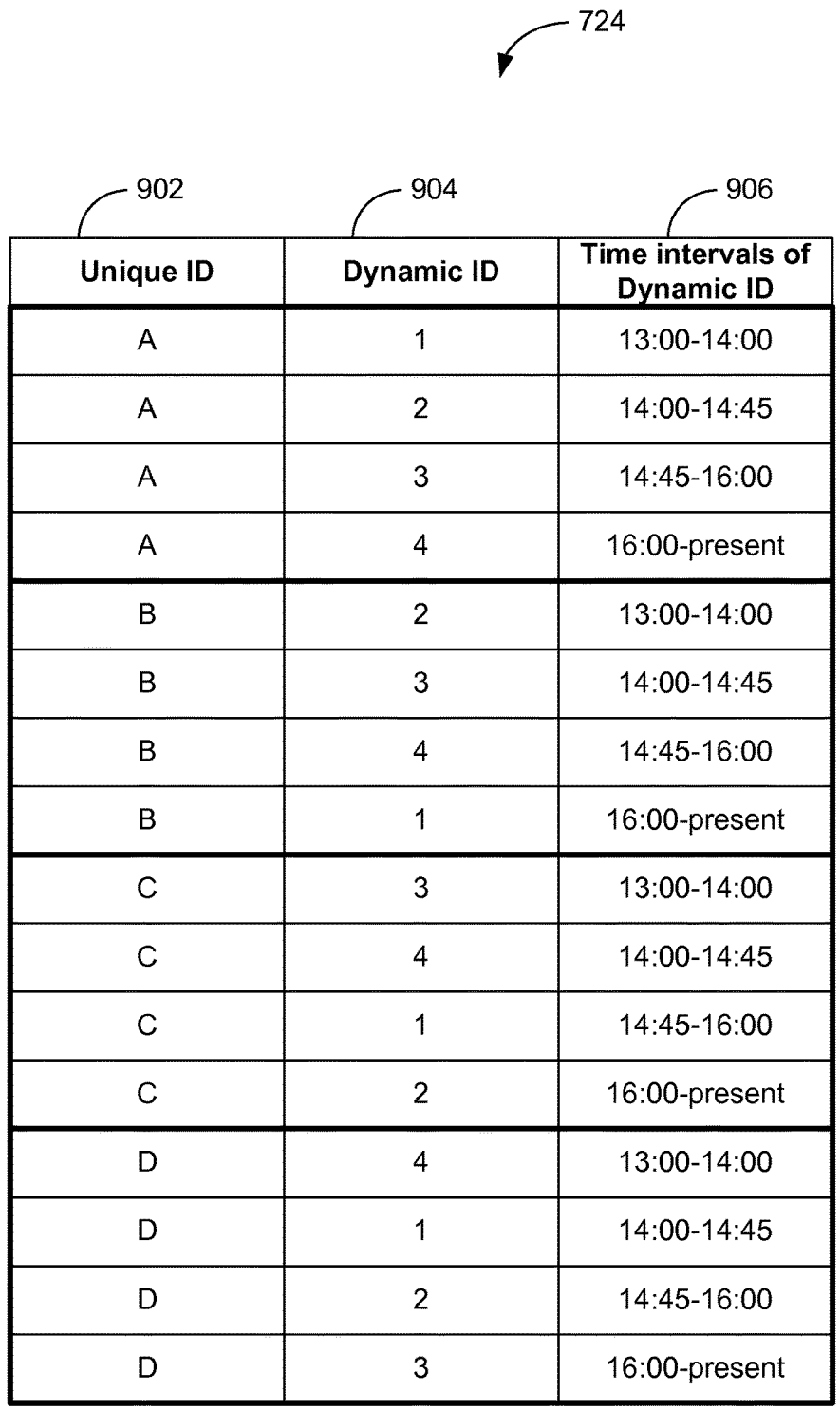
FIG. 9 illustrates an example data structure for storing unique identifiers and dynamic identifiers and their mappings in accordance with some embodiments.

As described above, at the server 700, user data 724 includes unique identifiers 726, dynamic identifiers 728, and mappings 730 of unique identifiers to dynamic identifiers. FIG. 9 illustrates an example data structure 900 for storing unique identifiers and dynamic identifiers and their mappings in accordance with some embodiments. Data structure 900 in FIG. 9 stores the dynamic identifiers 904 for four users, with respective unique identifiers 902 A, B, C, and D, within an activity group. In some embodiments, the data structure 900 is organized as a table, as illustrated in FIG. 9. The table is, for example, a table in a database. In some other embodiments, the data structure 900 is organized in some other suitable manner.

The data structure 900 as illustrated in FIG. 9 shows the unique identifier to dynamic identifier mappings within one activity group. It should be appreciated that the data structure 900 is expandable and adaptable to show unique identifier to dynamic identifier mappings for multiple activity groups (e.g., by adding an additional field indicating the activity group).

In data structure 900, for each unique identifier 902, the data structure 900 shows the dynamic identifiers 904 mapped to that unique identifier 902 and the time intervals 906 that a dynamic identifier is mapped to a respective unique identifier. For example, for unique identifier "A," dynamic identifier "1" is mapped to "A" for the time interval from 13:00-14:00 (in some embodiments the date is also included in the time interval field 906 to fully record and account for when a dynamic identifier is mapped to a unique identifier; the date is omitted here for sake of brevity). The dynamic identifier "2" is mapped to the unique identifier "A" for the time interval 14:00-14:45. The dynamic identifier "3" is mapped to the unique identifier "A" for the time interval 14:45-16:00. The dynamic identifier "4" is mapped to the unique identifier "A" for the time interval 16:00-present.

For the unique identifier "B," dynamic identifier "2" is mapped to "B" for the time interval from 13:00-14:00. The dynamic identifier "3" is mapped to the unique identifier "B" for the time interval 14:00-14:45. The dynamic identifier "4" is mapped to the unique identifier "B" for the time interval 14:45-16:00. The dynamic identifier "1" is mapped to the unique identifier "B" for the time interval 16:00-present.

For the unique identifier "C," dynamic identifier "3" is mapped to "C" for the time interval from 13:00-14:00. The dynamic identifier "4" is mapped to the unique identifier "C" for the time interval 14:00-14:45. The dynamic identifier "1" is mapped to the unique identifier "C" for the time interval 14:45-16:00. The dynamic identifier "2" is mapped to the unique identifier "C" for the time interval 16:00-present.

For the unique identifier "D," dynamic identifier "4" is mapped to "D" for the time interval from 13:00-14:00. The dynamic identifier "1" is mapped to the unique identifier "D" for the time interval 14:00-14:45. The dynamic identifier "2" is mapped to the unique identifier "D" for the time interval 14:45-16:00. The dynamic identifier "3" is mapped to the unique identifier "D" for the time interval 16:00-present.

When new dynamic identifiers are generated for the user, the data structure 900 is updated with the new dynamic identifiers and their effective time intervals. The time intervals of the last dynamic identifiers are also updated within the data structure 900 to reflect the expiration of those dynamic identifiers.

In the example shown in FIG. 9, the dynamic identifiers are generated in a way that rotates the dynamic identifier values among the four unique identifiers in a regular pattern, but with irregular time intervals (i.e., consecutive time intervals have different lengths) that are synchronized across the users in the activity group (i.e., the users all have new dynamic identifiers generated at the same times). In some embodiments, other ways are possible. For example, dynamic identifiers with random values can be generated at regular or irregular time intervals. As another example, dynamic identifiers with random values can be generated at different intervals for each user of the activity group; the dynamic identifier generation is not synchronized across the users of the activity group.

Figure 10A:
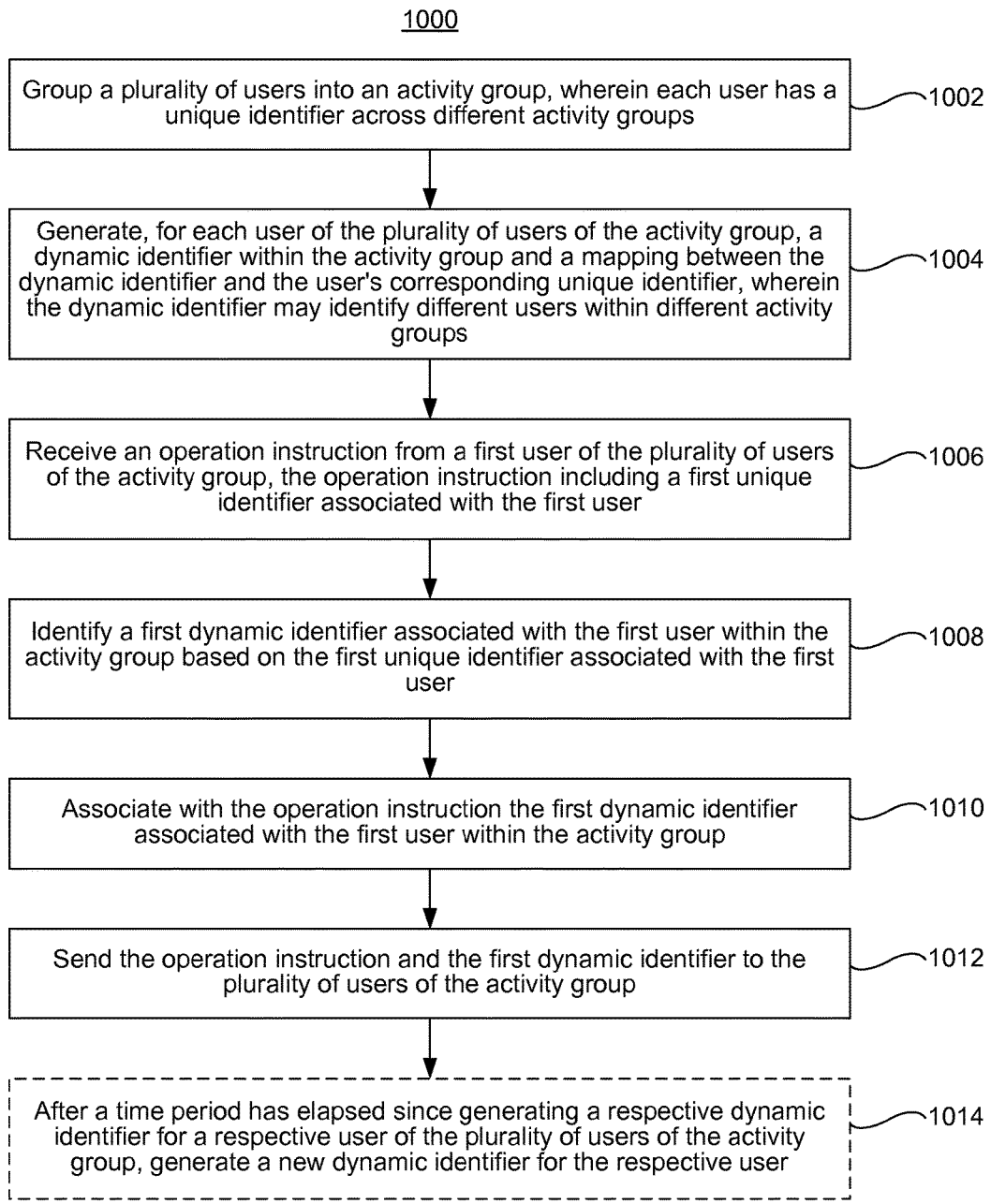
FIGS. 10A-10B illustrate a flow diagram of a method for hiding activity group member identification information in accordance with some embodiments.
Figure 10B:
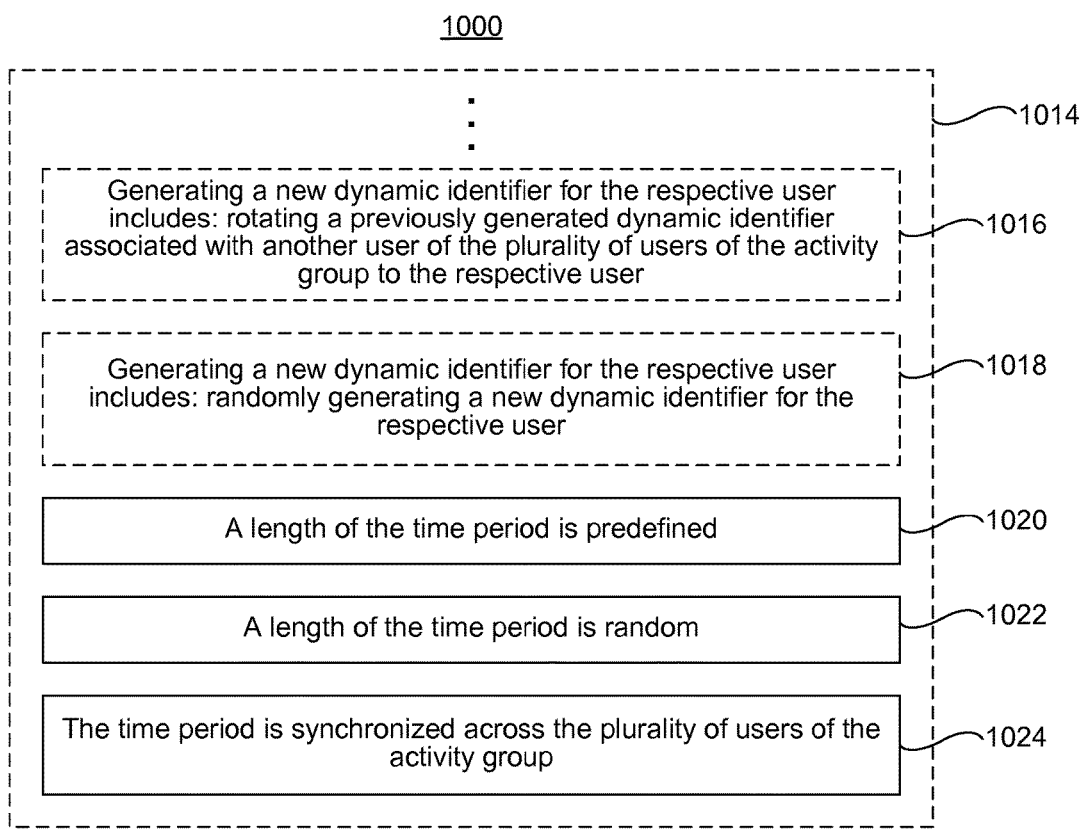

FIGS. 10A-10B illustrate a flow diagram of a method 1000 for hiding activity group member identification information in accordance with some embodiments. In some embodiments, the method 1000 is performed at a server system (e.g., server 700, the server illustrated in FIG. 4).

The server system groups (1002) a plurality of users into an activity group, where each user has a unique identifier across different activity groups. For example, the login and grouping module 720 of a server 700 accepts logins from users and add the users to respective activity groups (e.g., as in step 101 in FIG. 1 above). In some embodiments, a user specifies the activity group he wishes to join, and logs in through the login module 820. The login and grouping module 720 adds the user to the specified activity group. In some embodiments, the activity group to which the user is added is implicit in the login process; the user navigates to a page showing content (e.g., online game activity) from the activity group he wishes to join and logs in from there, and the server system interprets that as a login and a request to join that activity group. Each user has a unique identifier 726 stored in the server system; a user's unique identifier is unique across the server system and across different online applications or services and across different activity groups.

The server system generates (1004), for each user of the plurality of users of the activity group, a dynamic identifier within the activity group and a mapping between the dynamic identifier and the user's corresponding unique identifier, wherein the dynamic identifier may identify different users within different activity groups. A dynamic identifier generation module 722, for example, generates respective dynamic identifiers 728 for the users of an activity group; at any given point in time, each user of an activity group has a respective dynamic identifier. A generated dynamic identifier is mapped to the unique identifier of the user for which the dynamic identifier is generated. The server system determines a relationship (e.g., maps) a user's identity information (e.g., unique identifier) to an object identifier (e.g., dynamic identifier) (e.g., as in step 102 in FIG. 1 above). A dynamic identifier is unique within the activity group for which it is generated, but not unique across different activity groups. A user in one activity group can have the same dynamic identifier as another user in a different activity group; the values of their respective dynamic identifiers to which their respective unique identifiers are mapped to are the same. In some embodiments, the dynamic identifier is a "seat number" within the activity group, or some other non-unique value.

The server system receives (1006) an operation instruction from a first user of the plurality of users of the activity group, the operation instruction including a first unique identifier associated with the first user. The operation module 732 receives an operation instruction from the client device (e.g., client device 800) of a user. In some embodiments, the operation instruction includes the unique identifier of the user, of the client device, initiating the operation instruction, so that the server system can identify the user initiating the operation instruction. In some other embodiments, the operation module 732 identifies the user initiating the operation instruction through other methods.

In some embodiments, an operation instruction corresponds to an action taken by a user in an online application or service (e.g., an online game, online chat). For example, if the user takes an action in an online game (e.g., plays a card in a card game) at the client device, an operation instruction corresponding to that action is sent from the client device to the server system; the user initiates the operation instruction by taking the action within the online game.

The server system identifies (1008) a first dynamic identifier associated with the first user within the activity group based on the first unique identifier associated with the first user. The operation module 732 determines the dynamic identifier to which the unique identifier of the user initiating the operation instruction is mapped. For example, the operation module 732 refers to the data structure 900 and identifiers the dynamic identifier mapped to the unique identifier included with the operation instruction.

The server system associates (1010) with the operation instruction the first dynamic identifier associated with the first user within the activity group. The operation module 732 associates the dynamic identifier identified in step 1008 above to the operation instruction. For example, referring to data structure 900 (FIG. 9), if, during 14:35, an operation instruction from the user with the unique identifier "B" is sent to the server system, the operation instruction is associated with the dynamic identifier "3."

The server system sends (1012) the operation instruction and the first dynamic identifier to the plurality of users of the activity group. The operation instruction and the dynamic identifier associated with it are sent to the client devices of the users within the activity group (e.g., as in step 103 in FIG. 1 or step 302 in FIG. 3 above). In some embodiments, the operation instruction and the associated dynamic identifier are sent to the client devices of all the users within the activity group; each client device where a user of the activity group is logged in with the server system receives the operation instruction and dynamic identifier.

When a client device receives an operation instruction and associated dynamic identifier, the operation module 834 at the client device determines whether the associated dynamic identifier matches the dynamic identifier mapped to the unique identifier of the user using the client device (e.g., as in step 203 in FIG. 2 above). If the associated dynamic identifier matches the dynamic identifier of the user at the client device, the operation instruction is ignored, as the user at the client device was the initiator of the instruction and thus the operation instruction is already performed when the user initiated the operation instruction (e.g., as in step 303-"Player A" in FIG. 3 above).

Figure 3:
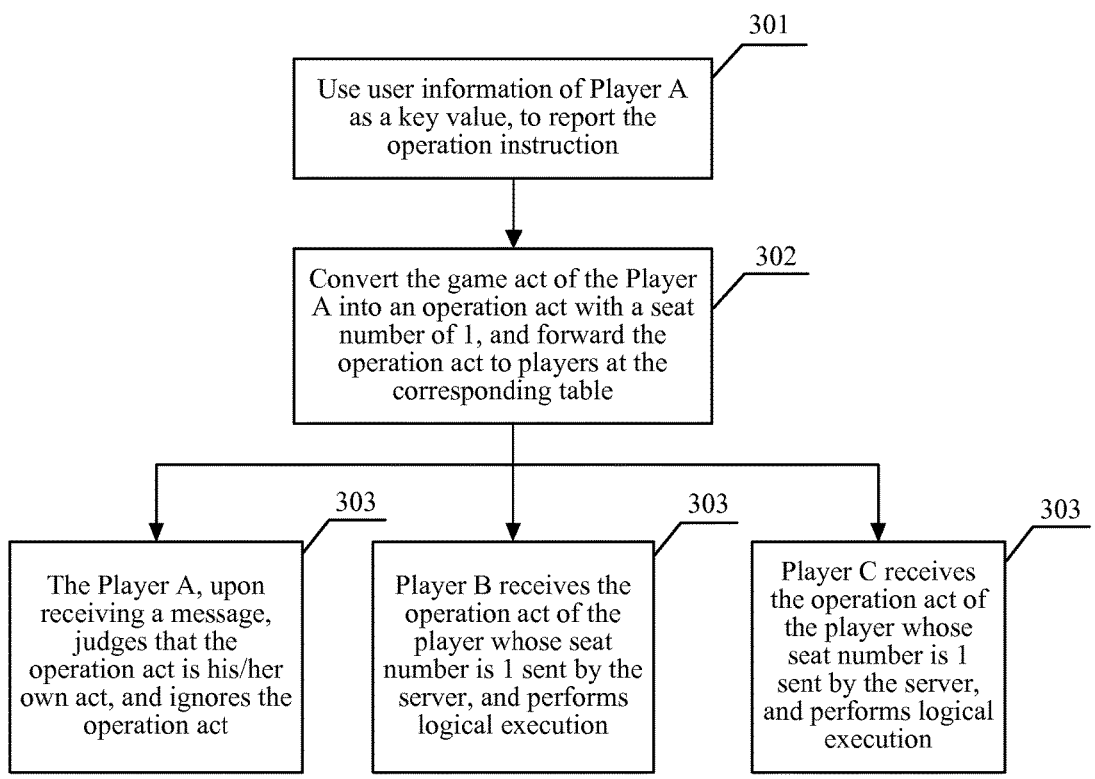
FIG. 3 is a schematic flow chart of a method according to an embodiment of the present application.

If the associated dynamic identifier does not match the dynamic identifier of the user at the client device, the operation module 834 performs the operation instruction, as the user at the client device is not the initiator of the instruction and thus the operation instruction is performed so that the user at the client device can be aware of the action taken by the user initiating the operation instruction (e.g., as in step 203 in FIG. 2 or step 303-"Player B" or step 303-"Player C" in FIG. 3 above).

In some embodiments, after a time period has elapsed since generating a respective dynamic identifier for a respective user of the plurality of users of the activity group, generating a new dynamic identifier for the respective user (1014). The dynamic identifier generation module, after a time period since generating the dynamic identifier for a user, generates a new dynamic identifier for the user, so that the user cannot be identified by other users due to a static identifier. Thus the dynamic identifier is dynamic—the identifier is not static.

In some embodiments, generating a new dynamic identifier for the respective user includes rotating (1016) a previously generated dynamic identifier associated with another user of the plurality of users of the activity group to the respective user. For example, as illustrated in the data structure 900, between 13:00-14:00, unique identifier "A" is mapped to dynamic identifier "1," unique identifier "B" is mapped to dynamic identifier "2," unique identifier "C" is mapped to dynamic identifier "3," and unique identifier "D" is mapped to dynamic identifier "4." In the succeeding interval, 14:00-14:45, unique identifier "A" is mapped to dynamic identifier "2," unique identifier "B" is mapped to dynamic identifier "3," unique identifier "C" is mapped to dynamic identifier "4," and unique identifier "D" is mapped to dynamic identifier "1." In the succeeding interval, the dynamic identifiers are rotated again amongst the users of the activity group, and so on.

In some embodiments, generating a new dynamic identifier for the respective user includes randomly generating (1018) a new dynamic identifier for the respective user. Returning to the example shown in the data structure 900, instead of rotating values amongst the users of the activity group, dynamic identifiers are generated with random values. Thus, for example, for the time interval 16:00-present, instead of the values "4", "1," "2," and "3" for dynamic identifiers for "A", "B," "C," and "D," respectively, the values for the dynamic identifiers are random numbers, such as "3," "7," "6," and "17" for "A", "B," "C," and "D," respectively.

In some embodiments, a length of the time period is predefined (1020). The length of the time period or interval when a new dynamic identifier is generated for a user is predefined. For example, a new dynamic identifier is generated for a user (in some embodiments, each user) every hour, half hour, one minute, ten minutes, or any other suitable time interval.

In some embodiments, a length of the time period is random (1022). The length of the time period or interval when a new dynamic identifier is generated for a user is random. For example, a new dynamic identifier is generated for a user (in some embodiments, each user) at a random time interval (in some embodiments, within a predefined range of acceptable time intervals) after the generation of the last dynamic identifier.

In some embodiments, the time period is synchronized across the plurality of users of the activity group (1024). Dynamic identifiers are generated at the same times for all users in the activity group, thus resulting in the users of the activity group changing dynamic identifiers changing at the same time. As shown in the data structure 900, for example, the time intervals of the users' dynamic intervals are the same; the users' dynamic intervals are changed in unison. In some other embodiments, each user of the activity group has an individual schedule for dynamic identifier generation. For example, for user "A" a dynamic identifier is generated every hour, for user "B" a dynamic identifier is generated every half hour, for user "C" a dynamic identifier is generated every two hours, and for user "D" a dynamic identifier is generated every three-quarters hour. As another example, dynamic identifiers are generated for each user of the activity group at different respective random intervals.

Thus, according to some embodiments of the invention, the unique identifiers of the users of an activity group are hidden from the users of the activity group, and the dynamic identifiers change, resulting in the users being unable to identify a user by dynamic identifier either. This has a benefit of preventing user collusion in an online application or service where such collusion is undesirable, e.g., collusion and cheating by players in an online game.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of anonymizing users of an online service, comprising:
    at a server system:
        receiving log-in information from a user, wherein the login information includes a unique identifier that is indicative of the user's identity;
        generating, for the user, a dynamic identifier for an activity group of which the user is a member, wherein the activity group includes a plurality of users other than the user;
        storing the dynamic identifier as a randomly generated key value for the unique identifier;
        receiving an operation instruction from the user, the operation instruction including the unique identifier and a request to perform an operation within the activity group;
        using the unique identifier, identifying, among a plurality of pre-stored randomly generated key values, a randomly generated key value as the dynamic identifier for the user;
        hiding the identity of the user from whom respective operation instructions are received by:
            sending, to the plurality of users of the activity group, the operation instruction for execution of the operation by the plurality of users, wherein the user is identified to the plurality of users only by the dynamic identifier and not the unique identifier for the user; and
            after a time period has elapsed since the generating operation, while the user is still in the activity group, re-generating a new dynamic identifier for the user from which to send subsequent operation instructions for execution of the operation by the plurality of users in replacement of the previously-generated dynamic identifier.

2. The method of claim 1, wherein generating, for the user, the dynamic identifier for the activity group of which the user is a member includes: rotating a previously assigned dynamic identifier associated with another user of the activity group to the user.

3. The method of claim 1, wherein generating the new dynamic identifier for the user includes: randomly generating the new dynamic identifier for the user.

4. The method of claim 1, wherein a length of the time period is predefined.

5. The method of claim 1, wherein a length of the time period is random.

6. The method of claim 1, wherein the time period is synchronized across the plurality of users of the activity group.

7. A server system, comprising:
    one or more processors; and
    memory storing one or more programs, wherein the one or more programs are configured to be executed by the one or more processors, the one or more programs including instructions for:
        receiving log-in information from a user, wherein the login information includes a unique identifier that is indicative of the user's identity;

generating, for the user, a dynamic identifier for an activity group of which the user is a member, wherein the activity group includes a plurality of users other than the user;

storing the dynamic identifier as a randomly generated key value for the unique identifier;

receiving an operation instruction from the user, the operation instruction including the unique identifier and a request to perform an operation within the activity group;

using the unique identifier, identifying, among a plurality of pre-stored randomly generated key values, a randomly generated key value as the dynamic identifier for the user;

hiding the identity of the user from whom respective operation instructions are received by:

sending, to the plurality of users of the activity group, the operation instruction for execution of the operation by the plurality of users, wherein the user is identified to the plurality of users only by the dynamic identifier and not the unique identifier for the user; and after a time period has elapsed since the generating operation, while the user is still in the activity group, re-generating a new dynamic identifier for the user from which to send subsequent operation instructions for execution of the operation by the plurality of users in replacement of the previously-generated dynamic identifier.

8. The server system of claim 7, wherein generating, for the user, the dynamic identifier for the activity group of which the user is a member includes: rotating a previously assigned dynamic identifier associated with another user of the activity group to the user.

9. The server system of claim 7, wherein generating the new dynamic identifier for the user includes: randomly generating the new dynamic identifier for the user.

10. The server system of claim 7, wherein a length of the time period is predefined.

11. The server system of claim 7, wherein a length of the time period is random.

12. The server system of claim 7, wherein the time period is synchronized across the plurality of users of the activity group.

13. A non-transitory computer readable storage medium storing one or more programs, the one or more programs comprising instructions, which when executed by a server system, cause the server system to:

receive log-in information from a user, wherein the login information includes a unique identifier that is indicative of the user's identity;

generate, for the user, a dynamic identifier for an activity group of which the user is a member, wherein the activity group includes a plurality of users other than the user;

store the dynamic identifier as a randomly generated key value for the unique identifier;

receive an operation instruction from the user, the operation instruction including the unique identifier and a request to perform an operation within the activity group;

using the unique identifier, identifying, among a plurality of pre-stored randomly generated key values, a randomly generated key value as the dynamic identifier for the user;

hide the identity of the user from whom respective operation instructions are received by:

sending, to the plurality of users of the activity group, the operation instruction for execution of the operation by the plurality of users, wherein the user is identified to the plurality of users only by the dynamic identifier and not the unique identifier for the user; and after a time period has elapsed since the generating operation, while the user is still in the activity group, re-generating a new dynamic identifier for the user from which to send subsequent operation instructions for execution of the operation by the plurality of users in replacement of the previously-generated dynamic identifier.

14. The non-transitory computer readable storage medium of claim 13, wherein generating, for the user, the dynamic identifier for the activity group of which the user is a member includes: rotating a previously assigned dynamic identifier associated with another user of the activity group to the user.

15. The non-transitory computer readable storage medium of claim 13, wherein generating the new dynamic identifier for the user includes: randomly generating the new dynamic identifier for the user.

16. The non-transitory computer readable storage medium of claim 13, wherein a length of the time period is predefined.

17. The non-transitory computer readable storage medium of claim 13, wherein a length of the time period is random.

* * * * *